US005759680A

United States Patent [19]

Brooks et al.

[11] Patent Number: 5,759,680
[45] Date of Patent: Jun. 2, 1998

[54] EXTRUDED COMPOSITE PROFILE

[75] Inventors: Joe G. Brooks, Springdale; Billy D. Goforth, Fayetteville; Charles L. Goforth, Lowell, all of Ark.

[73] Assignee: Advanced Environmetal Recycling Technologies, Inc., Junction, Tex.

[21] Appl. No.: 8,886

[22] Filed: Jan. 22, 1993

Related U.S. Application Data

[63] Continuation of Ser. No. 530,910, May 30, 1990, abandoned, which is a continuation-in-part of Ser. No. 491,061, Mar. 14, 1990, Pat. No. 5,088,910.

[51] Int. Cl.$^6$ ............................................. B32B 5/16
[52] U.S. Cl. ..................... 428/326; 428/364; 428/378; 428/537.1
[58] Field of Search ............................................. 428/326

[56] References Cited

U.S. PATENT DOCUMENTS

| 225,822 | 3/1880 | Grossman . |
| 2,778,923 | 1/1957 | Soliman . |
| 3,546,143 | 12/1970 | Corbett ..................... 260/2.5 |
| 3,560,324 | 2/1971 | Quackenbush . |
| 3,718,536 | 2/1973 | Downs . |
| 3,888,810 | 6/1975 | Shinomura ............... 260/17.4 BB |
| 4,003,866 | 1/1977 | Paturie ..................... 260/17.4 R |
| 4,056,591 | 11/1977 | Goettler et al. ............. 264/108 |
| 4,915,764 | 4/1990 | Miani ....................... 156/244.19 |

FOREIGN PATENT DOCUMENTS

| 516 918 | 12/1971 | France . |
| 2103 685 | 8/1972 | Germany . |
| 2305150 | 8/1974 | Germany . |
| 149 481 | 3/1980 | Germany . |

OTHER PUBLICATIONS

Farrell Company, Bulletin 211–A, "Screw–Type Extruding Machines for the Rubber Industry".
Plastics Engineering, "Plastics Waste: Recovery of Economic Value".
Plastics Extrusion Technology Handbook by Sidney Levy, P.E.
"Polymer Extrusion" by Chris Rauwendaal.
"Plastics Extrusion Technology and Theory" by Gerhard Schenkel, Dr. Ing.
Testimony of Joe G. Brooks (vol. 1).
Testimony of Billy Dean Goforth (vol. 1).
Testimony of Glenn Harold Alford (vol. 2).
Testimony of Roger A. Wittenberg (vol. 2).
Testimony of James B. Bookamer (vol. 2).
Testimony of Lawrence W. Umstadter (vol. 2).
Testimony of Boyd David Cox (vol. 2).
Testimony of Granville J. Hahn (vol. 2).
Testimony of Dugald S. McDougall (vol. 2).
Letter to Joseph G. Brooks from Raymond T. Woodhams dated May 12, 1994.
"Poster Abstracts" for the Woodfiber–Plastic Composites Conference, Un. of Wisc.–Madison, Apr. 28–30, 1991.
Bibliograph—"Composites from Plastics and Wood–Based Fillers" compiled by G.E. Meyers and P.C. Kolosick, 1991.
Recyclingplas V, May 23, 1990.
The New York Times, Monday, Oct. 23, 1989, "Preparing to Operate, Polymerix Fills Post".
Securities & Exchange Com., Washington, D.C., Form 10–K for Polymerix, Inc., Annual Report.
Albany Democrat Herald, Apr. 10, 1990, "Firm recycles plastic into picnic tables".
File History of Rivenite trademark.
Plastics Extrusion Technology (1988), edited by Friedhelm Hensen, pp. 247–248, 697–702.
Centre De Recherche E Pates Et Papiers, "Use of Wood Fibers in Thermoplastic Composites".

(List continued on next page.)

*Primary Examiner*—Jenna Davis
*Attorney, Agent, or Firm*—Gardere & Wynne, L.L.P.

[57] ABSTRACT

An extruded composite material comprising a discontinuous phase of cellulosic fiber encapsulated in and bonded to a continuous phase of a polymeric component preferably comprising a major portion of recycled polyethylene.

43 Claims, 1 Drawing Sheet

OTHER PUBLICATIONS

Modern Plastics Encyclopedia 1988, pp. 2–3, 193–196.

Handbook of Fillers for Plastics 1987, edited by Harry S. Katz, pp. 420–426.

Dyno Overlays, Inc., "Metron® Medium Density Overlay" 1987.

Journal of Applied Polymer Science, "Kinetics and Equilibria of Water Sorption in LLDPE–Cellulose Composites", vol. 32, 5661–5663 (1986).

"Age of Wood, Progress Through Wood Research", U.S. Dept. of Agriculture, (circa 1986).

Plastics Extrusion Technology, "Extrusion of pipes, profiles and cables", Chapter 3, pp. 56–94 (1988).

Polymer Engineering and Science, Oct. 1984, vol. 24, No. 15, 1166–1171, "Wood Fibers as Reinforcing Fillers for Polyolefins", Woodhams et al.

Plastics Waste, Jacob Leidner (1981), pp. 25–29, 42–44, 66–73, 145–148.

Plastics Today News, "HDPE/Wood Fiber Composites Gird for Structural Uses" (undated, circa 1990).

Techline, United States Dept. of Agriculture, (Dec. 1989).

Plastics Extrusion Technology Handbook (excerpts).

Trimax Corp. brochure, "The Solid Waste Crisis" (undated, pre–1990).

Polymerix, Inc. brochure, (undated, pre–1990).

Superwood Limited (undated).

Report to Securities and Exchange Commission from David C. Chapman, Chief Financial Officer of Advanced Environmental Recycling Technologies, Inc. dated May 13, 1994.

Letter to J. B. Brooks from G. D. Templeton dated Mar. 3, 1994.

Memorandum from Joe G. Brooks to Bob Gorsche dated Feb. 25, 1994.

Hearthbrite Firelogs Advertisement by Juniper Products Corporation.

In Business magazine article "From Animal Feed to Lumber", summer 1991.

"Lumber Products with a Conscience" by William L. Roberts, Mar. 1991.

Letter to Bill Orser from L. W. Umstadter dated Jun. 6, 1990.

Riverhead Milling, Inc. brochure.

Philadelphia Business Journal, pp. 5–8, Dec. 10, 1990.

Marketing Agreement between Riverhead Milling, Inc. and Hearthbrite Industries, Inc., dated May 1989.

Letter to Jeffrey A. Baumel from E. Lamar Pettus dated Jun. 23, 1989.

Letter from J. Patrick Ryan to Security and Exchange Commission dated Jun. 27, 1989.

Annual Report, Form 10–K, to Securities and Exchange Commission from Hearthbrite Industries, Inc. dated Jan. 27, 1988.

Quarterly Report, Form 10–Q, to Securities and Exchange Commission from Hearthbrite Industries, Inc. dated May 16, 1988.

Quarterly Report, Form 10–Q, to Securities and Exchange Commission from Hearthbrite Industries, Inc. dated Mar. 14, 1988.

Quarterly Report, Form 10–Q, to Securities and Exchange Commission from Hearthbrite Industries, Inc. dated Aug. 14, 1987.

Letter to Cecil Schenker, Esq. from Scott H. Malin dated Feb. 5, 1987.

Letter to Philip A. Forgione from Cecil Schenker, Esq. dated Jan. 30, 1987.

Letter from Boyd David Cox, Esq. to Joe Brooks dated Mar. 10, 1988.

Rivenite Technical Manual.

State of New Jersey, Dept. of Law and Public Safety, letter to Philip A. Forgione dated Mar. 5, 1985.

Undated Filpat Manufacturing Co., Inc. memo regarding physical properties.

Rivenite Brochure (Mobil Exh. 47).

Hearthbrite Industries, Inc. Notice of Special Meeting of Shareholders, dated Jun. 10, 1988.

Hearthbrite Industries, Inc. Notice of Annual Meeting of Shareholders dated Sep. 16, 1987.

Quarterly Report, Form 10–Q, to Securities and Exchange Commission from Hearthbrite Industries, Inc. dated May 14, 1987.

Letter from Boyd D. Cox, Esq. to Joe Brooks, dated February 11, 1987 with enclosures.

Quarterly Report, Form 10–Q, to Securities and Exchange Commission from Hearthbrite Industries, Inc. dated Feb. 12, 1987.

Amendment No. 2 to Form S–18, Securities and Exchange Commission, Hearthbrite Industries, Inc., dated Jun. 27, 1986.

Juniper Products, Inc. Business Plan, Nov. 19, 1986.

Securities and Exchange Commission, Form 10–K, Hearthbrite Industries, Inc., dated Dec. 23, 1986.

Hearthbrite Industries, Inc. Annual Report 1986.

United States Testing Company, Inc., Report of Test to Windsor Synfuel Corporation, dated Feb. 6, 1985.

Letter from Stanley Door Systems to Windsor Synfuel Corporation dated Jun. 3, 1985 with enclosure.

Letter from Peachtree Windows and Doors to Mr. Philip A. Forgione, dated Jun. 12, 1985.

Agreement between Redmar Investors, Inc. and Southern Minerals and Fibers, Inc. dated Jun. 13, 1985.

Letter from Therma Tru Corp. to Windsor Synfuel Corporation dated Sep. 19, 1985 with enclosures.

USA Today, "Home Improvement Guide", dated Friday, Sep. 27, 1985.

Letter from Thermboard to Mr. Phillip Forgione dated Dec. 4, 1985 with enclosures.

"Tuff Timbers" Brochure (undated).

The New York Times article "Log's Made of Dried Leaves" (undated).

Accounting Issues Paper (undated).

The Redmar Process dated Dec. 1983.

Mobil v. AERT, Inc. trial testimony (vol. 1).

Mobil v. AERT, Inc. trial testimony (vol. 2).

Polymer Composites, Jan., 1985, vol. 6, No. 1, p. 21, "Effect of Compounding on the Properties of Short Fiber Reinforced Injection Moldable Thermoplastic Composites".

Cellulose Chemistry and Technology, 19, 3–8 (1985), "Water Retention Values of Heated Celluloses".

"The Processing of Fiber Reinforced Thermoplastics Using Co–Rotating Twin Screw Extruders" by David Wall, 778 ANTEC '87.

Load–Bearing Fibre Composites, by M. R. Piggott, Pergamon, Toronto, pp. 168–170.

Journal of Applied Polymer Science, vol. 25, 1217–1244 (1980), "Shear Flow Rheological Properties, Fiber Damage, and Mastication Characteristics of Aramid–, Glass– and Cellulose–Fiber–Reinforced Polystyrene Melts" by Lech Czarnecki and James L. White.

Deposition of Bernard C. Governale (vol. 1).

Deposition of Bernard C. Governale (vol. 2).

Jury Verdict Form dated Feb. 15, 1994.

Memorandum Opinion (Denial of Motion for New Trial) dated May 20, 1994.

Memorandum Opinion (Inequitable Conduct) dated May 20, 1994.

Report of Investigation of the Office of the Inspector General, U.S. Department of Transportation, dated Oct. 28, 1996 (twenty pages, including a three page Index of Attachments; attachments themselves were not received by Applicant).

"The Efficiency of Cellulosic fillers in Common Thermoplastics, Part 1. Filling Without Processing Aids or Coupling Agents", *Intern. J. Polymeic Material*, 1984, vol. 10, pp. 159–187.

"Use of Grafted Aspen Fibers in Thermoplastic Composites: IV Effect of Extreme Condition on Mechanical Properties of Polyethylene Composites," *Polymer Composites*, 1986, vol. 7, pp. 337–348.

A letter dated Aug. 12, 1992 from Mr. Seavey, Business Development Mgr. of Composite Products Division, Mobil Chemical Company, to Mr. Willett, Director of Office of Engineering for the Federal Highway Administration.

A letter dated Sep. 1, 1992 from Mr. Staron of the Federal Highway Administration to Mr. Seavey, Composite Products Division, Mobil Chemical Company.

Draft of Sep. 1, 1992 letter (above identified) from Mr. Staron to Mr. Seavey, with an endorsement at the bottom of page by Charles L. O'Donnell, Geometric Design Engineer for the Federal Highway Administration.

A memorandum dated Nov. 3, 1992 from L. L. Smith to K. N. Morefield, Florida Department of Transportation.

Copy of Final Report on Workshop on Composite Materials and Recycled Materials for Roadside Safety Hardware dated Oct. 31, 1991 and produced for the U.S. Dept. of Transportation, Federal Highway Administration.

Copy of Interim Report titled Utilization of Recycled Plastics for Highway Applications, FY 89–90, under Un. of Florida Standard Research Agreement WPI 0510546, State Project 99700–7519–010.

A paper titled "Recycled Plastics for Highway Agencies" by Lawrence Smith and Richard Ramer presented in Mississauga, Ontario on May 4, 1992.

A technical note dated Nov. 5, 1991, titled "A Study of Recycled Plastic Composites for Highway Applications" by Mr. Dutta of the U.S. Army Cold Regions Research and Eng. Laboratory.

A paper titled "New and Recycled Plastic Composites for Roadside Safety Hardware" by McDevitt and Dutta, reprinted from *Plastics in Building Construction, vol. XVIII, No. 2*.

A paper dated Aug. 13, 1992 titled "Moisture Absorption Study of Rivenite" by Peterson and Hwong of the Army Cold Regions Research and Engineering Laboratory.

*Plastics Today* News, "HDPE/Wood Fiber Composites Gird for Structural Uses" Nov. 1989.

Pennsylvania Recyclable Materials Market Development Study, Commonwealth of Pennsylvania, Department of Environmental Resources, Bureau of Waste Management, 1988.

Transcript of Helmuth W. Kutta, Ph.D., written notes dated Oct. 31, 1994 of East German Patent 149 481.

Handwritten translation notes dated Oct. 25, 1994 of Helmuth W. Kutta, Ph.D. for East German Patent 149 481 (Gessner).

Final Judgment Pursuant to Federal Rule of Civil Procedure 54 (b) dated Aug. 4, 1994.

Affidavit of Joe G. Brooks (with exhibits) dated Jun. 4, 1994.

Affidavit of Monty L. Ross (with exhibits) dated Jun. 6, 1994.

Affidavit of John W. Montgomery dated Jun. 6, 1994.

Letter from Convert/EDA to Dr. Richard A. Ramer dated Nov. 28, 1989.

Riverhead Milling, Inc. brochure, "Better Products Through Recycling", 4 pages, at least as early as Nov. 28, 1989.

Convert/EDA brochure with a date at least as early as Nov. 28, 1989.

News Release dated Sep. 20, 1988.

Technical Information Bulletin dated Sep. 1988.

Letter dated Feb. 9, 1989 to Larry W. Umstadter at Convert/EDA from Mr. R. H. Whaley, Plastics of Florida, USA, Inc.

Letter to Mr. Anton Finelli, CSI dated Mar. 6, 1989.

*Biocycle*, Industry News, "Plastic Recycling Venture", dated Nov./Dec. 1988.

Product label for Convert/EDA's Recycled Plastic Resin.

Plastics Recycling Foundation, Center for Plastics Recycling Research, "Plastics Recycling: A Strategic Vision" at least as early as Nov. 28, 1989.

CPI Purchasing, "The Coming Storm: Waste Disposal" by Stephen Barlas, dated Jan. 1989, p. 27.

*Biocycle*, "Recycling in New Jersey", by Jim Glenn, pp. 35–38, dated Nov./Dec. 1987.

*The Ledger*, Monday, Jan. 25, 1988, "Fla. may soon be separating its garbage" by Tom Palmer.

Roadway Express shipping label from Riverhead Milling to Dr. Richard Ramer, Fl. D.O.T.; dated Dec. 7, 1989.

5,759,680

EXTRUDED COMPOSITE PROFILE

CROSS-REFERENCE TO RELATED APPLICATION

This application is a file wrapper continuation of application Ser. No. 07/530,910, filed May 30, 1990, now abandoned, which is a continuation-in-part of U.S. application Ser. No. 07/491,061, filed Mar. 14, 1990, now issued as U.S. Pat. No. 5,088,910.

TECHNICAL FIELD

This invention relates to a composite material comprising a discontinuous phase of cellulosic fiber encapsulated in a polymeric matrix. More particularly, this invention relates to extruded composites comprising discontinuous wood fibers encapsulated and substantially aligned in a continuous polymeric phase consisting primarily of polyethylene.

BACKGROUND OF THE INVENTION

The encapsulation of cellulosic fibers in a polymeric matrix is known, having previously been disclosed for example in U.S. Pat. Nos. 3,836,412; 4,228,116; 4,248,743; 4,376,144; and 4,792,020.

U.S. Pat. No. 3,836,412 discloses composites of discontinuous organic fiber bonded in a vulcanized elastomer.

U.S. Pat. No. 4,228,116 discloses a process for producing remoldable panels by continuously plastifying and extruding an at least partially aggregated mixture comprising about 40 to about 60 weight percent cellulosic filler, and rolling the web of extruded material prior to its solidification.

U.S. Pat. No. 4,248,743 discloses dispersing wet wood pulp in a mixture of polyethylene, carbon black and ethylene vinyl acetate rubber in a Brabender mixer. The amount of fiber added ranged from 10.3 to 15.9 parts by weight fiber per 100 parts of the sum of polyethylene and rubber.

U.S. Pat. No. 4,376,144 dislcoses treating cellulose fibers with vinyl chloride polymer, a plasticizer and an isocyanate bonding agent to produce moldable or extrudable composites.

U.S. Pat. No. 4,791,020 discloses composites comprising wood fiber dispersed in and bonded to a mixture of polyethylene (or a copolymer of ethylene and propylene) and a compound containing at least one isocyanate group made by processing the mixture in an internal mixer or extruder, or on a roll mill.

In papers titled "Use of Eastern Hardwoods in Wood Fiber/Plastic Composites" and "Compounding Wood Fibers and Recycled High Density Polyethylene Using a Twin-Screw Extruder", Michigan State University (1988), researchers reported composites made by mixing up to 60 weight percent wood fibers into a high density polyethylene matrix in a twin-screw extruder. Use of a double planetary mixer equipped with a hot oil bath was not able to provide adequate melting of the HDPE and resulted in excessive charring and degradation of wood fiber. Mixing in a single-screw extruder only worked well for fiber levels up to about 10 percent by weight.

Notwithstanding the processes previously disclosed by others, there remains a need for a strong composite material comprising substantially aligned cellulosic fibers dispersed in a polyolefinic matrix. Such material will desirably utilize recycled polymeric material, will be capable of being extruded, and will not swell or absorb any appreciable amount of moisture.

SUMMARY OF THE INVENTION

According to the present invention, it has now been discovered that extruded composite products can be produced which are strong and exhibit excellent fiber encapsulation and related physical properties without relying on special lubricants, plasticizers or bonding agents. The composite products made by the method of the invention preferably comprise a discontinuous phase of substantially aligned cellulosic fibers encapsulated in a continuous polymeric phase preferably comprising polyethylene, and optionally, from about 10 to about 15 weight percent polypropylene.

The composite materials disclosed herein are useful for making synthetic wood products such as building materials (roof shingles, siding, floor tiles, paneling, moldings, structural components, steps, door and window sills and sashes); house and garden items (planters, flower pots, landscape tiles, decking, outdoor furniture, fencing and playground equipment); farm and ranch items (pasture fencing, posts, barn components); and marine items (decking, bulkheads, pilings), etc.

According to one preferred embodiment of the invention, an extrudate is provided that comprises a continuous phase further comprising at least one recycled polymeric material and a discontinuous phase of cellulosic fiber distributed throughout and encapsulated in the recycled polymeric material. Minor amounts of contaminants such as paper and labels can also be present in the recycled polymeric material without detrimentally affecting the product.

According to another preferred embodiment of the invention, an extruded composite material is provided wherein a major portion of the cellulosic fibers are dispersed throughout a polymeric matrix and are substantially aligned in the flow direction.

According to another embodiment of the invention, a composite material is provided that comprises from about 30 to about 70 weight percent fiber encapsulated in from about 70 to about 30 weight percent polymer.

According to a particularly preferred embodiment of the invention, cellulosic fiber and polymeric materials are preferably combined and mixed in a ratio ranging from about 40 weight percent polymer and 60 weight percent fiber to about 60 weight percent polymer and 40 weight percent fiber until the working temperature of the mixture is between about 290 and about 350 degrees F. or higher, depending upon the type of polymeric material used. The mixture is then preferably subdivided into particles having a maximum dimension of about 1.5 inches and subsequently extruded while maintaining the stock temperature within the encapsulation temperature range. During extrusion, the encapsulated fibers are substantially aligned in the flow direction. As the extrudate passes through the die, the surface temperature is preferably elevated to improve surface properties. After exiting the extruder, rollers are preferably used to maintain dimensional stability of the extrudate until the surface temperature of the extrudate decreases to about 140 degrees F. and the core temperature decreases to about 180 degrees F. or less.

The composite material disclosed herein preferably comprises less than about 6 weight percent moisture, and most preferably, less than about 3 weight percent moisture. The cellulosic fiber utilized in the composite material of the invention preferably has an average fiber width or diameter less than about ⅛ inch and an average fiber length less than about 1 ½ inches, and most preferably, a fiber width of about 1/16 inch and a length of about ⅜ inches.

BRIEF DESCRIPTION OF THE DRAWING

The composite material of the invention is further described and explained in relation to the following drawings wherein.

DESCRIPTION OF THE PREFERRED EMBODIMENTS

Figure 1:
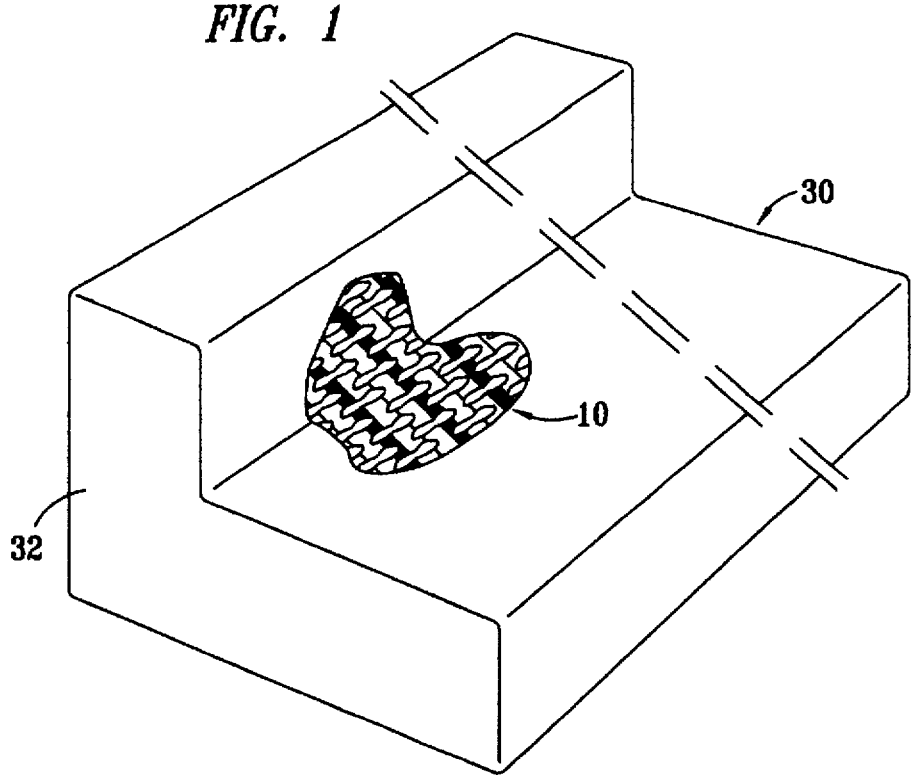
FIG. 1 is a simplified perspective view of an extruded profile comprising a preferred composite material of the invention, which further depicts in the inset detail the dispersion and substantial alignment of the cellulosic fibers in the flow direction within the continuous polymeric phase.

Referring to FIG. 1, the preferred principal materials for use in producing the compositions of the invention are wood fiber and polyolefins. The starting wood and plastic materials are identified, processed, mixed, and then formed into building material products through use of an extruder and subsequent rolling processes to produce products which have advantages over natural wood and over other synthetic materials, such that products of the present invention are ordinarily less expensive; have excellent insulating properties; are highly resistant to insect infestation, rotting, splitting, cracking, warping, thermal expansion or absorption of moisture; can be easily shaped and machined; and, in many cases, have superior structural integrity. Although many types and sources of wood or other cellulosic fiber and mixtures thereof are available and can be used within the subject compositions, a preferred wood fiber for use in the present invention is juniper or cedar fiber, and most preferably, *Juniper Mexicana* (popularly known as Texas cedar), which has been steamed at a pressure of about 20 psig to remove some of the more volatile naturally occurring resins and oils.

Cedar fiber is presently available as a waste product from cedar oil mills. However, because the raw waste from cedar oil mills usually includes relatively large chunks of wood as well as tramp materials such as rocks, metal and the like, the cedar fiber is desirably decontaminated and classified by the use of conventional equipment such as screens, shakers, separators and magnets prior to storing it in holding bins or silos pending use in making the subject composite material.

According to a preferred embodiment of the invention, all tramp materials and wood particles over ⅛ inch in width or diameter are removed from the wood fiber, and the wood fiber is further classified by length and diameter or by aspect ratio. Additional grinding may be required to reduce the particle size distribution of the wood fiber material to acceptable ranges. The wood fiber material preferred for use in the compositions of the invention consists mainly of splinters or slivers having a width or diameter less than about ⅛ inch and a length ranging from about 2 to about 12 times the width or diameter. Wood fibers having an average maximum width or diameter of about ¹⁄₁₆ inch and an average maximum length of about ⅜ inch are particularly preferred. Such splinters or slivers are likely to be irregularly shaped with jagged ends and/or edges.

Because of the hygroscopic nature of cellulosic fibers, drying is usually required. For use in making the composite material of the invention, the moisture content of the wood fiber is preferably be less than about 15 percent, and most preferably, less than about 8 percent by weight. Excessive moisture in the wood fiber can impede bonding between the wood fiber and polymeric material, increase the required processing time, and cause pitting or bubbling in the finished product. Thus, whatever the identification of the wood product raw feed material is, it is important to reduce the moisture content to a level which will avoid the problems of pitting or bubbling in the finished product. A conventional, variable speed, tunnel drier fueled by waste wood chips or other fuel can be used to reduce the moisture content of the cedar fibers. It is also believed that microwave technology can be used to flash off moisture if desired.

The polymeric material utilized in the subject materials preferably comprises a major portion of at least one polyolefin, with polyethylene being particularly preferred. The source and type of polyethylene used in the invention can vary widely and can include, for example, both high density (HDPE) and low density (LDPE) materials. Numerous sources of waste HDPE and LDPE are available. Preferred sources of polyethylene include recycled materials such as, for example, off-spec resin from manufacturers, as well as rejects, scrap and post-consumer and industrial waste from containers for milk, distilled water, fruit juices, soft drink concentrates, liquid detergents, bleach, and the like, floor sweepings, and plastic coating waste from hydropulpers that has been processed to reduce its fiber content to less than about 10 percent by weight.

The polymeric material is preferably identified, screened, cleaned, dried and classified prior to storage. If not already in granular, flake or pellet form, the material is desirably ground to a maximum particle dimension not exceeding about ¼ inch. When prepared for use in the invention, the moisture content of the polymeric material is preferably less than about 6 percent by weight, and most preferably, only trace amounts of moisture will remain. The cleaned and dried plastic feed material is preferably classified as to resin type and physical properties (such as melt flow and viscosity ranges), and stored in various holding bins pending further processing.

Presently, it is envisioned that high density polyethylene (HDPE) and low density polyethylene (LDPE) are the preferred types of waste plastic materials.

HDPE has a density of greater than approximately 0.94 g/cc, measured in accordance with ASTM D1505, and a melt index of less than approximately 1.0 g/10 minutes, measured in accordance with ASTM D1238, Condition 190/2.16. An example of such type material is Marlex polyethylene, resin number EHM 6007, manufacture by Phillips 66, Bartlesville, Okla.

LDPE has a density of less than approximately 0.94 g/cc, measured in accordance with ASTM D1505, and a melt index of greater than approximately 1.0 g/10 minutes, measured in accordance with ASTM D1238, Condition 190/2.16. An example of such type material is Polyethylene 5004 extrusion coating resin manufactured by The Dow Chemical Company, Midland, Mich.

Although polyethylene is a preferred polymeric material for use in producing the fiber-encapsulated composite materials as disclosed herein, other polyolefinic and polymeric materials can also be used in the invention subject to the considerations discussed in more detail below. Other plastics which can be used within the scope of the invention include those which can be processed with extrusion equipment at temperatures that do not adversely affect the wood fiber feed component (such as by charring or the like) so as to produce an unacceptable product.

According to one preferred embodiment of the invention, a mixture of polyethylene and from about 10 to about 15 weight percent polypropylene is used as the polymeric component in the subject method. The percentage of polypropylene used will desirably depend upon the viscosity and melt index of the polyethylene, with less polypropylene being used where a major portion of the polyethylene is high density rather than low density. In general, increasing the amount of polypropylene within the preferred ranges will improve the structural or physical properties of the resultant composite material.

From about 40 to about 60 weight percent wood fiber and from about 60 to about 40 weight percent plastic prepared and selected as discussed above are preferably metered into a scale pit and then conveyed by means such as a bucket elevator into an overhead holding bin, or else directly into the feed hopper of a compounding machine. It should be understood that the relative percentage of wood to plastic preferred for use in a particular application can vary, and will depend upon factors such as the type, size and moisture content of the wood fiber; the type, size and physical properties of the plastic material being utilized; and the physical properties desired in the composite material being produced by the process. Batch size will preferably range from about 1000 to about 1200 pounds, considering the combined weights of the fiber and plastic feed materials, although it is understood that other batch sizes may be more appropriate, depending upon the size of the processing equipment.

A satisfactory compounding machine for use in making the materials of the invention is an insulated, hot-oil jacketed, sigma blade, double arm mixer modified by the addition of means such as an infrared sensor to permit monitoring of the working stock temperature of the mixture.

According to a preferred embodiment of the invention, the temperature of the hot oil circulated through the jacket of the compounding machine can be selected within a range between about 300 and about 600 degrees F. A hot oil set point of about 450 degrees F. is satisfactory for use in making the preferred compositions disclosed herein. The mixer blades are preferably variable speed, and are rotated at approximately 30 revolutions per minute. Mixing continues for so long as is needed to raise the stock temperature of the mixture to the encapsulation point, usually between about 290 and about 350 degrees F.

It has been discovered that whenever wood fiber and plastic comprising a major portion of polyethylene are mixed and held in suspension under these conditions, the wood fibers will disperse into and be encapsulated within a continous phase of the plastic material, and will bond to the plastic. As used herein, the term "encapsulation point" means the lowest stock or mixture temperature at which thorough dispersion, encapsulation and bonding of the cellulosic fiber within the polymeric matrix are achieved. The encapsulation point will generally be at a temperature above the softening point of the polymeric material, and will fall within the encapsulation range. It is understood, however, that the preferred encapsulation range can extend upward to the temperature where thermal degradation of the polymer or wood fiber component begins to occur.

As used herein, the term "encapsulation range" refers to the temperature range at which the fiber/plastic mixture can be processed and extruded, and the preferred encapsulation range will normally bracket the encapsulation temperature by about plus or minus 20 degrees F. By way of example, for mixtures comprising about 55 weight percent cedar fiber and about 45 weight percent LDPE, the encapsulation range is preferably from about 280 degrees F. to about 320 degrees F. For composite material comprising about 55 weight percent fiber and about 45 weight percent of a mixture further comprising about 60 weight percent LDPE and about 40 weight percent HDPE, the encapsulation range is preferably from about 320 degrees F. to about 360 degrees F.

Although the time required to reach the encapsulation point will necessarily vary according to factors such as the type and amount of fiber and plastic utilized, moisture content of the feed materials, feed temperature, relative humidity, mixing speed, and the temperature of the hot oil, it is believed that mixing times ranging from about 30 minutes to about 75 minutes are sufficient to achieve thorough mixing and encapsulation under the range of process conditions disclosed herein.

Figure 2:
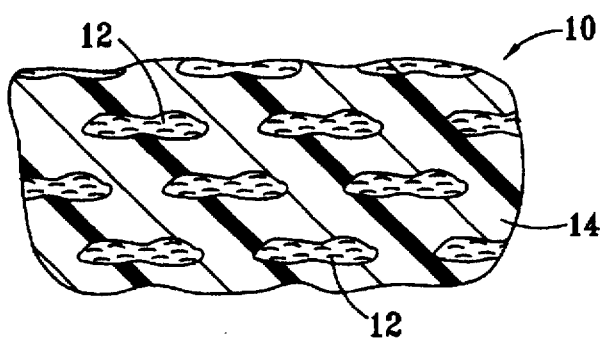
FIG. 2 depicts an enlarged detail view of the inset portion of FIG. 1.
Figure 3:
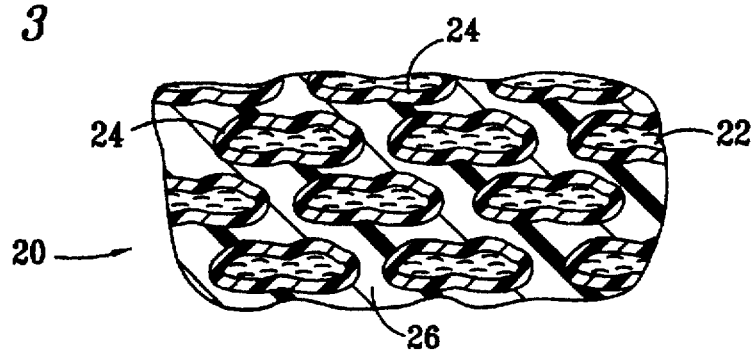
FIG. 3 depicts an enlarged detail view of a section of an extruded composite material comprising substantially aligned wood fibers believed to be individually encapsulated within a thin resole layer and dispersed throughout a continuous polymeric phase in accordance with another embodiment of the invention.

The process disclosed above yields a composite product 10 comprising a plurality of wood fibers 12 dispersed throughout a continuous phase of polymeric material 14 as shown in FIG. 2, which is an enlarged detail view of a portion of the encapsulated material following extrusion. Although the mechanism by which encapsulation occurs is not fully understood, it is believed that naturally occurring resins and oils released from the wood fibers during mixing can react or combine with the polymeric material near the surface of the wood fibers to produce a boundary layer of resole or phenolic-aldehyde material that individually encapsulates the wood fibers dispersed throughout the continuous polymeric phase. FIG. 3, another enlarged detail view of a portion of the encapsulated material following extrusion, depicts composite product 20 comprising wood fibers 22 each surrounded by a phenolic boundary layer 24 and dispersed throughout a continuous phase of polymeric material 26 as previously disclosed. A composite material comprising wood fibers surrounded by such a boundary layer is believed likely to exhibit superior flame retardancy over a product lacking such a boundary layer.

Following encapsulation, the bonded fiber/plastic mixture has a clumpy, doughy consistency and is desirably transferred to the feed hopper of a size reduction unit comprising counter-rotating shafts with intermeshing, radially extending members adapted to break the mixture into smaller-sized pieces. The feed hopper of the size reduction unit is desirably heated by conventional means so as to maintain the temperature of the mixture within the encapsulation range. In the size reduction unit, the clumps of encapsulated material are desirably reduced to particles having a maximum dimension of about 1 ½ inches or less. Larger clumps can cause surging when the material is fed to an extruder, and can make it more difficult to control the orientation of the wood fibers within the extruded composite.

Following size reduction, the encapsulated mixture can be run through a conventional roll mill if desired to incorporate other additives such as fire retardants, ultraviolet stabilizers, catalysts, virgin or engineered resins, or other materials which are likely to be degraded if subjected to prolonged mixing in the compounding machine.

The encapsulated mixture is then fed to an extruder modified for extruding fiber/plastic composites. A satisfactory extruder for use in extruding batches of the encapsulated mixtures as disclosed herein is a compounding extruder having a screw with a feed section that is preferably about 12 inches in diameter and from about 12 to about 30 inches long. The feed section of the screw preferably tapers at approximately a 45 degree angle to a compression section having a diameter of about 6 inches and a length of from about 30 to about 36 inches. In the feed section, the flights of the extruder screw are preferably spaced about 10 inches apart, have a thickness of about ¾ inch, and a depth of about 3 inches. In the compression section, the flights of the extruder screw are preferably spaced about 5 inches apart, have a thickness of about ¾ inch, and a depth of about 1 inch. The extruder screw will preferably be rotatable at various speeds, and the preferred rotational speed will depend upon factors such as the desired throughput, the nature and properties of the feed material, the configuration of the extrudate, desired surface properties, and the like.

The temperature of the encapsulated fiber/plastic mixture is preferably maintained within the encapsulation range from the time the encapsulation temperature is first reached in the compounding machine until the extrudate passes through the extruder die. It is therefore desirable that means be provided to dissipate the heat that may otherwise build up in the compression section of the extruder due to the mechanical work done on the mixture by the rotating screw.

The compression section of the extruder is preferably jacketed and a cooling medium is circulated through the jacket to maintain the temperature of the encapsulated mixture within the encapsulation range. If the temperature of the encapsulated mixture is permitted to drop significantly below the encapsulation range, the material will not flow properly, thereby increasing the mechanical energy required to work the material, and causing irregularities in the resultant extrudate. On the other hand, if the temperature of the encapsulated mixture significantly exceeds the maximum temperature of the encapsulation range, the extrudate will not be dimensionally stable, and polymer degradation, charring of the wood fiber, or autoignition can occur.

By way of example, a mixture of 55 weight percent cedar fiber and 45 weight percent LDPE should not be allowed to reach a temperature greater than about 450 degrees F. except for slight exposure of the surface to a higher temperature as discussed below while passing through the die. Similarly, except for the surface temperature while passing through the die, a mixture of 55 weight percent cedar fiber encapsulated in 45 weight percent of plastic in turn comprising about 60 weight percent LDPE and about 40 weight percent HDPE should not be allowed to reach a temperature greater than approximately 500 degrees F.

The extruder screw will desirably form the particles of encapsulated mixture into a homogeneous mass which is then preferably forced through a fiber alignment plate or other similarly effective means prior to reaching the extruder die. The primary functions of the fiber alignment plate are to disrupt any spiralling motion imparted to the material by the extruder screw, to avoid channeling and help balance the flow of material to the die as needed for extruding a desired profile, and to help align the encapsulated fibers within the material in the flow direction. Fiber alignment plates preferably comprise a plurality of spaced-apart bars or orifices adapted to substantially align the fibers without plugging off or breaking a substantial portion of the fibers.

After passing through the fiber alignment plate, the fiber-encapsulated mixture is preferably directed through a heated die. Most preferably, the extruder will be equipped with a bolster and interchangeable dies to facilitate changing the profile of the extrudate. The die is preferably equipped with conventional electrical heating elements such as band or cartridge heaters to maintain the interior walls of the die at an elevated temperature relative to the stock temperature of the extrudate. Increasing the surface temperature of the extrudate within these ranges will improve its finish and reduce the likelihood of tearing as it exits the extruder.

A preferred surface temperature range for extrudates comprising 55 weight percent cedar fiber encapsulated in 45 weight percent LDPE is from about 425 to about 450 degrees F. A preferred surface temperature range for extrudates comprising a similar mixture of cedar fiber with a plastic component comprising about 60 weight percent LDPE and about 40 weight percent HDPE is from about 460 to about 500 degrees F.

If desired, control of the extruder screw speed, jacket temperature and die temperature and pressure can all be automated by through the use of commercially available control equipment and instrumentation.

Also, if desired, an additonal surface layer comprising a different material can be coextruded onto the surface of the composite extrudate of the invention by use of an additional extruder and a conventional crosshead die.

After exiting the extruder die, the extrudate is preferably cooled under controlled conditions to avoid deformation or stress buildup until the core temperature of the extrudate is less than about 180 degrees F. The cooling time required for a particular profile will depend upon the temperature of the material exiting the die, the geometry of the extrudate, ambient conditions, and the extent of any external cooling.

The extrudate is preferably cut into segments having a desired length and then directed along a variable speed rolling and cooling conveyor. The guides and rollers on the conveyor are preferably adapted to exert minimal pressure on the extrudate to avoid inducing any appreciable stress that can weaken or deform the finished product.

After cooling, the lengths of product are collected and assembled for storage or shipment, or for further processing such as sawing, forming, milling, finishing, painting, and the like.

Referring to FIG. 1, extrudate 30 is an L-shaped profile which was extruded continuously and cut to form end surface 32. The inset detail 10, also depicted in enlarged form in FIG. 2, shows in simplified form the dispersion of the fibers 12 in the polymeric phase 14, and also the substantial alignment of the elongated fibers 12 in the direction of flow through the extruder, alignment plate and die.

Other alterations and modifications of the subject invention will become apparent to those of ordinary skill in the art upon reading the present disclosure, and it is intended that the scope of the invention be limited only by the broadest interpretation of the appended claims to which the inventors are legally entitled.

We claim:

1. A composite extruded profile comprising from about 30 weight percent to about 70 weight percent of an unfoamed continuous phase of cleaned and classified recycled thermoplastic polymeric material consisting essentially of polyethylene and from about 70 to about 30 weight percent of a discontinuous phase of cellulosic fiber particles encapsulated in said thermoplastic polymeric material, wherein the encapsulation is the result of thorough dispersion of the cellulosic fiber particles within the polymeric material at a temperature above the softening point of the polymeric material and below a temperature where thermal degradation of the polymeric material or cellulosic fiber particles occurs.

2. The extruded profile of claim 1 wherein said polyethylene comprises cleaned and classified recycled polyethylene having a maximum particle dimension up to about ¼ inch.

3. The extruded profile of claim 1 wherein said thermoplastic polymeric material consists essentially of polyethylene and from about 10 to about 15 weight percent polypropylene.

4. The extruded profile of claim 1 comprising from about 40 to about 60 weight percent of an unfoamed continuous phase of thermoplastic polymeric material and from about 60 to about 40 weight percent of wood fiber.

5. The extruded profile of claim 1 wherein the moisture content of said profile is less than about 3 weight percent.

6. The extruded profile of claim 1 wherein said cellulosic fiber particles are wood particles having an average width less than about ⅛ inch.

7. The extruded profile of claim 6 wherein the cellulosic fiber particles are wood particles having an average length ranging from about 2 to about 12 times the width.

8. The extruded profile of claim 7 wherein the cellulosic fiber particles are wood particles having an average maximum width of about 1/16 inch and an average maximum length of about ⅜ inch.

9. The extruded profile of claim 1 wherein the cellulosic fiber particles are devolatilized wood particles selected from the group consisting of juniper particles and cedar particles.

10. The extruded profile of claim 1 wherein the cellulosic fiber particles are Juniper Mexicana.

11. The extruded profile of claim 1 comprising about 55 weight percent cellulosic fiber particles and about 45 weight percent of a mixture further comprising about 60 weight percent low density polyethylene and about 40 weight percent high density polyethylene.

12. The extruded profile of claim 1 comprising about 55 weight percent cellulosic fiber particles and about 45 weight percent low density polyethylene.

13. The extruded profile of claim 1 wherein said cellulosic fiber particles are encapsulated in a phenolic-aldehyde coating and dispersed throughout said unfoamed continuous phase of polymeric material.

14. The extruded profile of claim 1 wherein the profile includes elongated fiber particles that are substantially aligned.

15. The extruded profile of claim 1, further comprising an additional surface layer of a different material that is coextruded onto the surface of the composite extruded profile.

16. The composite extruded profile of claim 1 wherein the polyethylene is selected from the group consisting of low density polyethylene, high density polyethylene and mixtures thereof.

17. The composite extruded profile of claim 16 wherein the polyethylene comprises up to about 40 weight percent high density polyethylene.

18. The extruded profile of claim 4 wherein the wood fiber is decontaminated and classified.

19. The extruded profile of claim 18 wherein the wood fiber is classified by length and diameter.

20. The composite extruded profile of claim 1 wherein the extruded profile is resistant to insect infestation, rotting and the absorption of moisture.

21. The composite extruded profile of claim 1 wherein the extruded profile is resistant to warping and thermal expansion.

22. A composite extruded profile made by providing from about 30 to about 70 weight percent of a thermoplastic polymeric material comprising a major portion of cleaned and classified recycled polyethylene and from about 70 to about 30 weight percent of cellulosic fiber particles having an average particle width less than about ⅛ inch and an average particle length ranging from about 2 to about 12 times the width; mixing and heating the polymeric material and the cellulosic fiber particles until the temperature of the mixture is above the softening point of the polymeric material, and maintaining the temperature of the mixture at about that level while mixing until the cellulosic fiber particles are thoroughly dispersed within a substantially continuous matrix of unfoamed polymeric material; and afterwards introducing the mixture into an extruder and extruding the mixture to produce the profile.

23. The extruded profile of claim 22 wherein the mixture of polymeric material and fiber particles is raised to and maintained at a temperature ranging between about 280 and about 390 degrees F. inside the mixer until the fiber particles are thoroughly dispersed within a continuous matrix of the polymeric material.

24. The extruded profile of claim 22 wherein the polymeric material and fiber particles are mixed for a time ranging from about 30 to about 75 minutes prior to extruding.

25. The extruded profile of claim 23 wherein the mixture of unfoamed polymeric material and fiber particles is maintained at a temperature less than about 500° F. during extrusion to produce the profile.

26. The extruded profile of claim 22 wherein mixing is continued until the fiber particles are encapsulated within the continuous matrix of unfoamed polymeric material.

27. The extruded profile of claim 22 wherein the fiber particles include elongate fiber particles that are substantially aligned during extrusion of the mixture to produce the profile.

28. The extruded profile of claim 22 wherein the thermoplastic material comprises polyethylene flakes or pellets.

29. The extruded profile of claim 22 having a coextruded surface layer comprising a different material.

30. The composite extruded profile of claim 22 wherein the extruded profile exits the extruder through a heated die at a surface temperature sufficiently high to create a uniform surface without tears.

31. The composite extruded profile of claim 30 comprising about 55 weight percent wood fiber, about 45 weight percent low density polyethylene, and having a surface temperature from about 425° to about 450° F.

32. The composite extruded profile of claim 30 comprising about 55 weight percent wood fiber, and about 45 weight percent polyethylene, the polyethylene further comprising about 60 weight percent low density polyethylene and about 40 weight percent high density polyethylene, and having a surface temperature ranging from about 460° to about 500° F.

33. An extruded profile made by a process comprising the steps of mixing from about 40 to about 60 weight percent wood particles with about 60 to about 40 weight percent polymeric material consisting essentially of cleaned and classified recycled polyethylene at a temperature ranging from about 280 to about 360 degrees F. until the wood particles are dispersed in a substantially continuous matrix of softened, unfoamed polymeric material and thereafter introducing the mixture into an extruder to extrude the profile.

34. The extruded profile of claim 33 wherein the polyethylene is cleaned and classified recycled polyethylene having a maximum particle dimension up to about ¼ inch.

35. A composite extruded profile comprising from about 30 weight percent to about 70 weight percent of an unfoamed continuous phase of thermoplastic polymeric material comprising a major portion of polyethylene and from about 70 to about 30 weight percent of a discontinuous phase of cellulosic fiber particles encapsulated in said thermoplastic material, wherein said polyethylene comprises cleaned and classified recycled polyethylene having a maximum particle dimension up to about ¼ inch and wherein the encapsulation is the result of thorough dispersion of the cellulosic fiber particles within the polymeric material at a temperature above the softening point of the polymeric material and below a temperature where thermal degradation of the polymeric material or cellulosic fiber particles occurs.

36. The extruded profile of claim 35 wherein the polyethylene is cleaned and classified recycled polyethylene having a maximum particle dimension up to about ¼ inch.

37. A composite extruded profile comprising from about 30 weight percent to about 70 weight percent of an unfoamed continuous phase of thermoplastic polymeric material comprising a major portion of polyethylene and from about 70 to about 30 weight percent of a discontinuous phase of cellulosic fiber particles encapsulated in said thermoplastic polymeric material, wherein the cellulosic fiber particles are devolatilized wood particles selected from the group consisting of juniper particles and cedar particles and wherein the encapsulation is the result of thorough dispersion of the cellulosic fiber particles within the polymeric material at a temperature above the softening point of the polymeric material and below the temperature where thermal degradation of the polymeric material or cellulosic fiber particles occurs.

38. A composite extruded profile comprising from about 30 weight percent to about 70 weight percent of an unfoamed continuous phase of thermoplastic polymeric material comprising a major portion of polyethylene and from about 70 to about 30 weight percent of a discontinuous phase of cellulosic fiber particles encapsulated in said thermoplastic material, wherein the cellulosic fiber particles are Juniper Mexicana and wherein the encapsulation is the result of thorough dispersion of the cellulosic fiber particles within the polymeric material at a temperature above the softening point of the polymeric material and below a temperature where thermal degradation of the polymeric material or cellulosic fiber particles occurs.

39. A composite extruded profile comprising about 45 weight percent of an unfoamed continuous phase of a mixture comprising about 60 weight percent low density polyethylene and about 40 weight percent high density polyethylene and about 55 weight percent of a discontinuous phase of cellulosic fiber particles encapsulated in said thermoplastic polymeric material, wherein the encapsulation is the result of thorough dispersion of the cellulosic fiber particles within the polymeric material at a temperature above the softening point of the polymeric material and below the temperature where thermal degradation of the polymeric material or cellulosic fiber particles occurs.

40. A composite extruded profile comprising about 45 weight percent of an unfoamed continuous phase of low density polyethylene and about 55 weight percent of a discontinuous phase of cellulosic fiber particles encapsulated in the low density polyethylene, wherein the encapsulation is the result of thorough dispersion of the cellulosic fiber particles within the polymeric material at a temperature above the softening point of the polymeric material and below the temperature where thermal degradation of the polymeric material or cellulosic fiber particles occurs.

41. A composite extruded profile comprising from about 30 weight percent to about 70 weight percent of an unfoamed continuous phase of thermoplastic polymeric material comprising a major portion of polyethylene and from about 70 to about 30 weight percent of a discontinuous phase of cellulosic fiber particles encapsulated in a phenolic-aldehyde coating and dispersed throughout said unfoamed continuous phase of polymeric material, wherein the encapsulation is the result of thorough dispersion of the cellulosic fiber particles within the polymeric material at a temperature above the softening point of the polymeric material and below a temperature where thermal degradation of the polymeric material or cellulosic fiber particles occurs.

42. A composite extruded profile made by providing about 45 weight percent low density polyethylene and about 55 weight percent wood fiber having an average particle width less than about ⅛ inch and an average particle length ranging from about 2 to about 12 times the width; mixing and heating the low density polyethylene and the wood fiber particles inside a jacketed mixer until the temperature of the mixture is above the softening point of the low density polyethylene, and maintaining the temperature of the mixture at about that level while mixing until the wood fiber particles are thoroughly dispersed within a substantially continuous matrix of the low density polyethylene; and afterwards introducing the mixture into an extruder and extruding the mixture to produce the profile; wherein the extruded profile exits the extruder through a heated dye at a surface temperature from about 425° F. to about 450° F.

43. A composite extruded profile made by providing about 45 weight percent polyethylene further comprising about 60 weight percent low density polyethylene and about 40 weight percent high density polyethylene, and about 55 weight percent wood fiber particles having an average particle width less than about ⅛ inch and an average particle length ranging from about 2 to about 12 times the width; mixing and heating the polyethylene and the wood fiber particles inside a jacketed mixer until the temperature of the mixture is above the softening point of the polyethylene, and maintaining the temperature of the mixture at about that level while mixing until the wood fiber particles are thoroughly dispersed within a substantially continuous matrix of unfoamed polyethylene; and afterwards introducing the mixture into an extruder and extruding the mixture to produce the profile; wherein the extruded profile exits the extruder through a heated dye at a surface temperature ranging from about 460° F. to about 500° F.

\* \* \* \* \*

UNITED STATES PATENT AND TRADEMARK OFFICE
CERTIFICATE OF CORRECTION

PATENT NO. : 5,759,680
DATED : June 2, 1998
INVENTOR(S) : Joe G. Brooks, et al.

It is certified that error appears in the above-identified patent and that said Letters Patent is hereby corrected as shown below:

Column 1, line 25, delete "4,792,020" and replace with –4,791,020--.
Column 1, line 38, delete "dislcoses" and replace with –discloses--.
Column 4, line 2, delete "be".
Column 4, line 51, delete "manufacture" and replace with –manufactured--.
Column 8, line 1, insert –It is important that the surface temperature of the mixture must be sufficiently high at the point where the mixture exits the extruder to create a uniform surface for the extruded products.— before "Increasing".
Column 8, line 14, delete "through".
Column 8, line 16, delete "additonal" and replace with –additional--.

Signed and Sealed this

Thirteenth Day of July, 1999

Attest:

Q. TODD DICKINSON

*Attesting Officer*          *Acting Commissioner of Patents and Trademarks*